United States Patent Office 3,471,442
Patented Oct. 7, 1969

3,471,442
PROCESS FOR THE PREPARATION OF THERMOPLASTIC POLYMERS PREPARED BY REACTING DIEPOXIDE MONOMERS WITH AROMATIC DIISOCYANATES
Roland Ralph DiLeone, Rowayton, Conn., assignor to American Cyanamid Company, Stamford, Conn., a corporation of Maine
No Drawing. Filed Feb. 2, 1967, Ser. No. 613,441
Int. Cl. C08g 33/04
U.S. Cl. 260—47                             8 Claims

ABSTRACT OF THE DISCLOSURE

The process of the present invention is directed to the preparation of thermoplastic polymers by heating a solution of a diepoxide monomer dissolved in an inert organic solvent at a temperature of at least 115° C., said solvent containing a catalytic quantity of an alkali metal alkoxide wherein an aromatic diisocyanate is added to the aforementioned solution in small increments over a period of about one hour and continuing the heating of the mixture after the incremental addition of the diisocyanate has been completed until the reaction between the diepoxide and the diisocyanate is substantially completed and thereafter separating the polymeric material from the solvent.

BACKGROUND OF THE INVENTION

The background of the invention is in the field of synthetic thermoplastic polymers prepared by reacting a bis-epoxide monomer with an aromatic diisocyanate so as to produce high molecular weight thermoplastic fabricatable materials which can be used as molding compositions, laminating compositions, potting resins, coating resins, and the like.

FIELD OF THE INVENTION

The field of the present invention is in the area of polyoxazolidones prepared by reacting bis-epoxides with aromatic diisocyanates.

DESCRIPTION OF THE PRIOR ART

The closest prior art known to the instant Applicant is an article published in the Journal of Polymer Science, Part A–1, vol. 4, pages 751–760 (1966), entitled "Polyoxazolidones Prepared from Bisurethanes and Bis-epoxides" by Yoshio Iwakura, Shin-ichi Izawa and Fusakazu Hayano, Department of Synthetic Chemistry, Faculty of Engineering, University of Tokyo, Tokyo, Japan.

SUMMARY OF THE INVENTION

This invention relates to a process for preparing polyoxazolidones having high molecular weight and being a thermoplastic fabricatable material, which process comprises heating a bis-epoxide monomer dissolved in an inert organic solvent at a temperature of at least 115° C. The heating is continued until the selected reaction temperature is reached, thereupon a catalytic material in the nature of an alkali metal alkoxide is added, preferably, just prior to the addition of the aromatic diisocyanate. The essence of the invention resides primarily in the incremental addition of the diisocyanate to the heated catalyzed solution of the bis-epoxide monomer in the inert organic solvent. The incremental addition is accomplished preferably in a period of about one hour and the increments are substantially equal in size and are added uniformly so that about $1/60$ of the total amount of the aromatic diisocyanate is added each minute over the one hour period. One could utilize a shorter period of time, such as 50 minutes, for the incremental addition, or a longer period of time, such as 70 minutes, wherein the size of the increments would be adjusted upwardly and downwardly with the diminished or increased periods of time. Periods of time significantly shorter than 50 minutes such as 15 minutes, 30 minutes or event 40 minutes, should be avoided inasmuch as the reaction between the di-epoxide monomer and the aromatic diisocyanate tends to be exothermic if too much of the diisocyanate is added over too short a period of time, developing a runaway reaction which produces either unuseable polymer or lower grade properties. Periods of time for carrying out the incremental addition significantly longer than 70 minutes, such as 2 hours or longer should be avoided solely for economic purposes since it only serves to extend the kettle time and thereby increases the cost of processing. The product produced, nevertheless, is equally as acceptable as that produced by the incremental addition over a one hour period. The longer times may be advantageous when operating temperatures are near the lower limits of the disclosed range.

In carrying out the process of the present invention the bis-epoxide monomer and the aromatic diisocyanate are used in substantially equimolar proportions as any appreciable deviation from equimolar proportions as any appreciable deviation from equimolar proportions will develop low molecular weight properties in the ultimate polymer produced.

Among the bis-epoxide monomers which may be used in the practice of the process of the present invention are: 2,2-bis[p-(2,3-epoxypropoxy)phenyl]propane, p-phenylenediglycidyl ether, m-phenylenediglycidyl ether, p,p' - biphenyldiglycidyl ether, p,p' - diphenylmethanediglycidyl ether, vinylcyclohexene diepoxide, dicyclopentadiene diepoxide, and the like. These bis-epoxides may be used solely or in combination with one another.

Among the aromatic diisocyanates which may be used in the practice of the process of the present invention are: 4,4'-diphenylmethane diisocyanate, 2,4-toluene diisocyanate, 2,6-toluene diisocyanate, mixed isomer-toluene diisocyanate, 4,4'-diphenyl diisocyanate, p-phenyl diisocyanate, m-phenyl diisocyanate, 4,4'-diphenylether diisocyanate, 4,4'-diphenyl-sulfide diisocyanate, and the like. These diisocyanates may be used singly or in combination with one another.

The temperature used to carry out the process of the present invention may be varied between about 115° C. and 300° C. and, preferably, between about 150° and 200° C.

As a matter of convenience, one will ordinarily use the refluxing temperature of the particular solvent selected although temperatures below and above the refluxing temperature of the solvent can be used. When using a temperature above the refluxing temperature of the solvent, such as when benzene is used, it will be necessary to apply superatmospheric pressure to the system in order to achieve a temperature within the ranges set forth hereinabove. In utilizing temperatures above 200° C., such as 225° C., 250° C., and even 300° C., care must be exercised to insure that no decomposition of either of the principal reactans, nor of the polyoxazolidones produced, nor of the solvent, takes place because of the use of such higher terperatures. As a matter of fact, temperatures above 200° C. can readily be avoided since solvents having boiling points at 200° C. and below are readily available and, therefore, there is no need to select higher boiling solvents where the risk of possible decomposition during processing may occur. Among the solvents which may be used are benzene, toluene, xylene, orthodichlorobenzene, chlorobenzene, bromobenzene, tetralin, Decalin, mesitylene, di-n-butyl ether, diisobutyl ether, diphenyl ether and nitrobenzene, and the like.

The amount of solvent used should be such as to provide an ultimate solids content of the polyoxazolidones in the solvent upon the completion of the reaction between about 20% and 80%, preferably, between 50%–70% solids.

Among the alkali metal alkoxides which may be used as the catalyst in the practice of the process of the present invention are lithium n-butoxide, potassium n-butoxide, sodium n-butoxide, lithium ethoxide, lithium methoxide, lithium isopropoxide, lithium n-propoxide, potassium ethoxide, potassium methoxide, potassium n-propoxide, potassium isopropoxide, sodium methoxide, sodium ethoxide, sodium n-propoxide, sodium isopropoxide, and the like. The amount of the alkoxide used as the catalytic material will be within the conventional range of catalytic proportions, namely, between about 0.1% and about 5%, by weight, based on the total weight of the bis-epoxide monomer and the aromatic diisocyanate. Preferably, one would use between about 0.5% and about 1.0%, by weight, same basis.

When the incremental addition of the diisocyanate has been completed, the heating is continued for a period of about 5 to 15 minutes in order to insure that the two reactants have substantially completely reacted with one another. Thereupon, the reaction mass may be separated from the solvent immediately by any one of a plurality of known techniques or, preferably, the reaction mass is cooled first and then the solvent is removed again by any one of a substantial plurality of known techniques such as precipitation in a non-solvent for the polymer, by devolatilization utilizing a vacuum, desiccation, and the like. The recovered polymeric material is a high molecular weight thermoplastic fabricatable material which displays its high molecular weight by possessing an inherent viscosity from about 0.25 to about 3.0 and, preferably from about 0.28 to 1.5 as measured in a 0.5% solution in dimethylformamide at 25° C.

As one slight modification of the concept of the present invention, the bis-epoxide monomer can be dissolved in the insert organic solvent as described and the catalytic material added, whereupon the total solution is then heated to the selected temperature followed by the incremental addition of the aromatic diisocyanate, the completion of the reaction, and, finally, the separation of the polymeric material from the solvent. However, in order to insure that the catalytic material is most effective throughout the polymerization reaction, it is preferred that the alkali metal alkoxide be added to the hot solution immediately before the aromatic diisocyanate incremental addition is begun.

In order that the concept of the present invention may be more completely understood, the following examples are set forth in which all parts are parts, by weight, unless otherwise indicated. These examples are set forth primarily for the purpose of illustration and any specific enumeration of detail contained therein should not be interpreted as a limitation on the case except as is indicated in the appended claims.

EXAMPLE 1

Into a suitable reaction vessel equipped with thermometer, stirrer, dropping funnel and reflux condenser there is introduced a solution of 70.8 parts of 2,2-bis[p-(2,3-epoxypropoxy)phenyl]propane in 106 parts of orthodichlorobenzene. The charge is heated with constant stirring to about 180° C. (reflux) at which time 0.5 part of a 0.20 molar solution of lithium butoxide in butanol is added. While maintaining the solution at reflux, there is then added 35.5 parts of 2,4-toluene diisocyanate uniformly in small increments over a one-hour period. At the end of the incremental addition, the reaction is continued for an additional fifteen minutes. Thereupon, the reaction mass is cooled and diluted with 150 parts of dimethyl formamide and the polymer is then precipitated in methanol. The precipitated polymer is then filtered from the non-solvent medium, dried and is ready for use in preparing a molded article.

EXAMPLE 2

Example 1 is repeated in substantially all essential details except that in the place of the 2,4-toluene diisocyanate there is used a mixed isomer containing 2,4-toluene diisocyanate, 80% and 2,6-toluene diisocyanate, 20%.

EXAMPLE 3

Example 1 is repeated in all essential details except that in the place of the 2,2-bis[p-(2,3-epoxypropoxy)-phenyl]-propane there is used 22.2 parts of p-phenylene diglycidyl ether and in the place of the 2,4-toluene diisocyanate there is substituted 23.6 parts of 4,4'-diphenyl diisocyanate.

EXAMPLE 4

Example 1 is repeated in all essential details except that in the place of the bis-epoxide monomer used there is used 29.8 parts of p,p'-biphenyl diglycidyl ether and in the place of the diisocyanate used there is substituted 16 parts of p-phenyl diisocyanate.

EXAMPLE 5

The polymers retrieved from Examples 1 and 2 are converted into molded pieces by subjecting the polymeric material to heat and pressure, namely at 200° C. temperature and 1000 p.s.i. The molded articles thus produced were subjected to a plurality of physical tests which are shown hereinbelow in Table I.

TABLE I.—POLYOXAZOLIDONES

|  | Example I | Example II |
| --- | --- | --- |
| Flexural strength (p.s.i.) | 20,200 | 12,700 |
| Flexural modulus (p.s.i.) | 500,000 | 500,000 |
| Tensile strength (p.s.i.) | 11,700 | 10,900 |
| Elongation, percent | 6.2 | 5.9 |
| Izod impact: |  |  |
| Notched (ft. lb./in.) | 0.36 | 0.20 |
| Unnotched (ft. lb./in.) | 4.90 | 2.40 |
| Rockwell hardness (M) | 106 | 110 |
| Inherent viscosity (DMF) | 0.44 | 0.58 |

I claim:

1. A process for preparing a high molecular weight thermoplastic fabricatable polyoxazolidone comprising heating a solution of a bis-epoxide monomer dissolved in an inert organic solvent at a temperature of at least 115° C. in the presence of catalytic quantities of an alkali metal alkoxide while adding an aromatic diisocyanate in small increments uniformly over a period of time of at least about 50 minutes, continuing the heating after the incremental addition is completed until the reaction between said bis-epoxide monomer and said diisocyanate is substantially complete, thereafter separating the polymeric material thus produced from said solvent.

2. A process according to claim 1 in which the heating is carried out at a temperature between about 150° C. and 200° C.

3. A process according to claim 1 in which the bisepoxide monomer is 2,2 - bis[p - (2,3-epoxypropoxy)-phenyl]propane.

4. A process according to claim 1 in which the bisepoxide monomer is p-phenylenediglycidyl ether.

5. A process according to claim 1 in which the bisepoxide monomer is p,p'-biphenyl diglycidyl ether.

6. A process according to claim 1 in which the diisocyanate is 2,4-toluene diisocyanate.

7. A process according to claim 1 in which the diisocyanate is 4,4'-diphenyl diisocyanate.

8. A process according to claim 1 in which the diisocyanate is p-phenyl diisocyanate.

References Cited
UNITED STATES PATENTS

| | | | |
|---|---|---|---|
| 3,020,262 | 2/1962 | Speranza | 260—47 |
| 3,334,110 | 8/1967 | Schramm | 260—307 |

WILLIAM H. SHORT, Primary Examiner

L. L. LEE, Assistant Examiner

U.S. Cl. X.R.

260—77.5